United States Patent Office 3,344,560
Patented Oct. 3, 1967

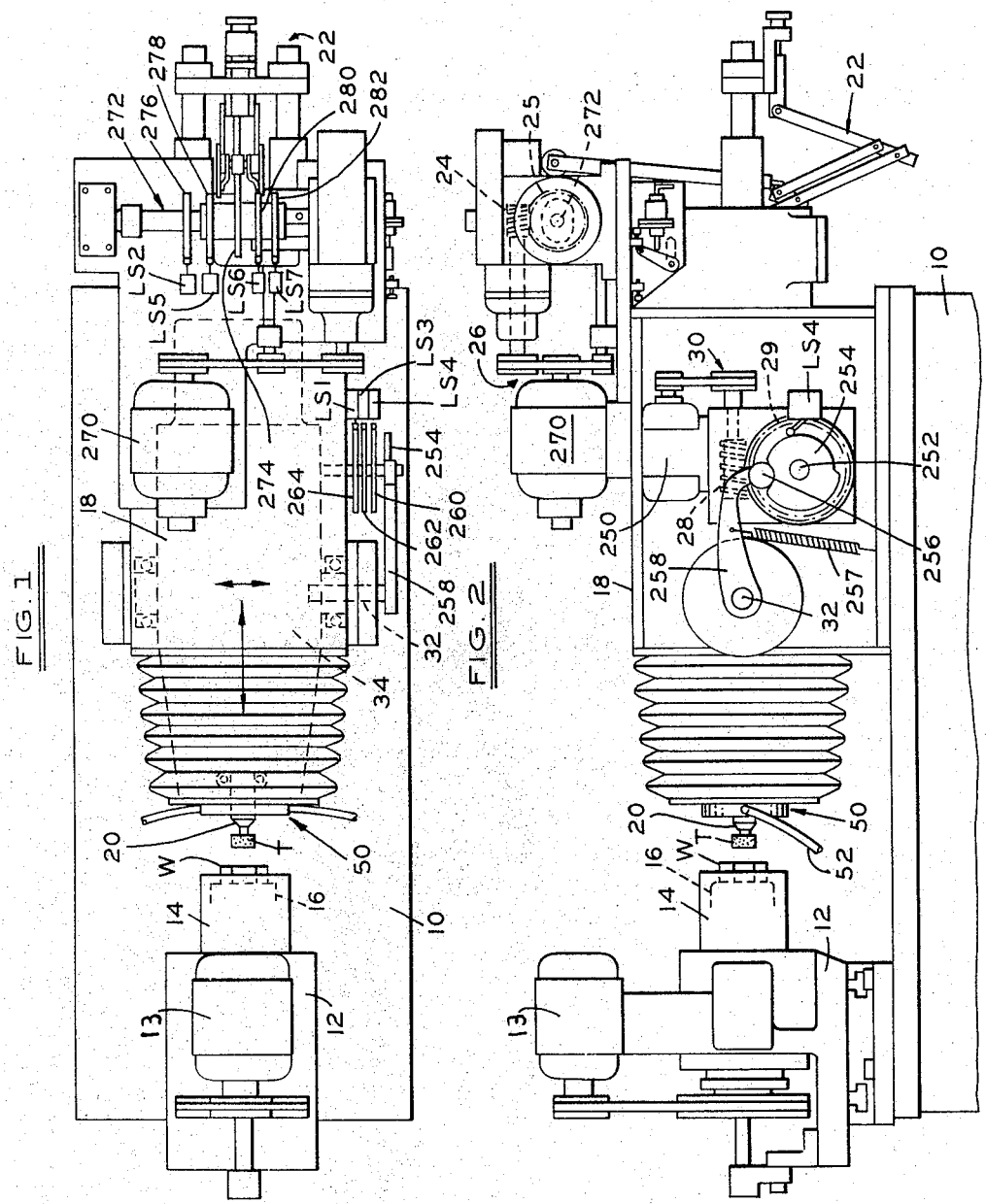

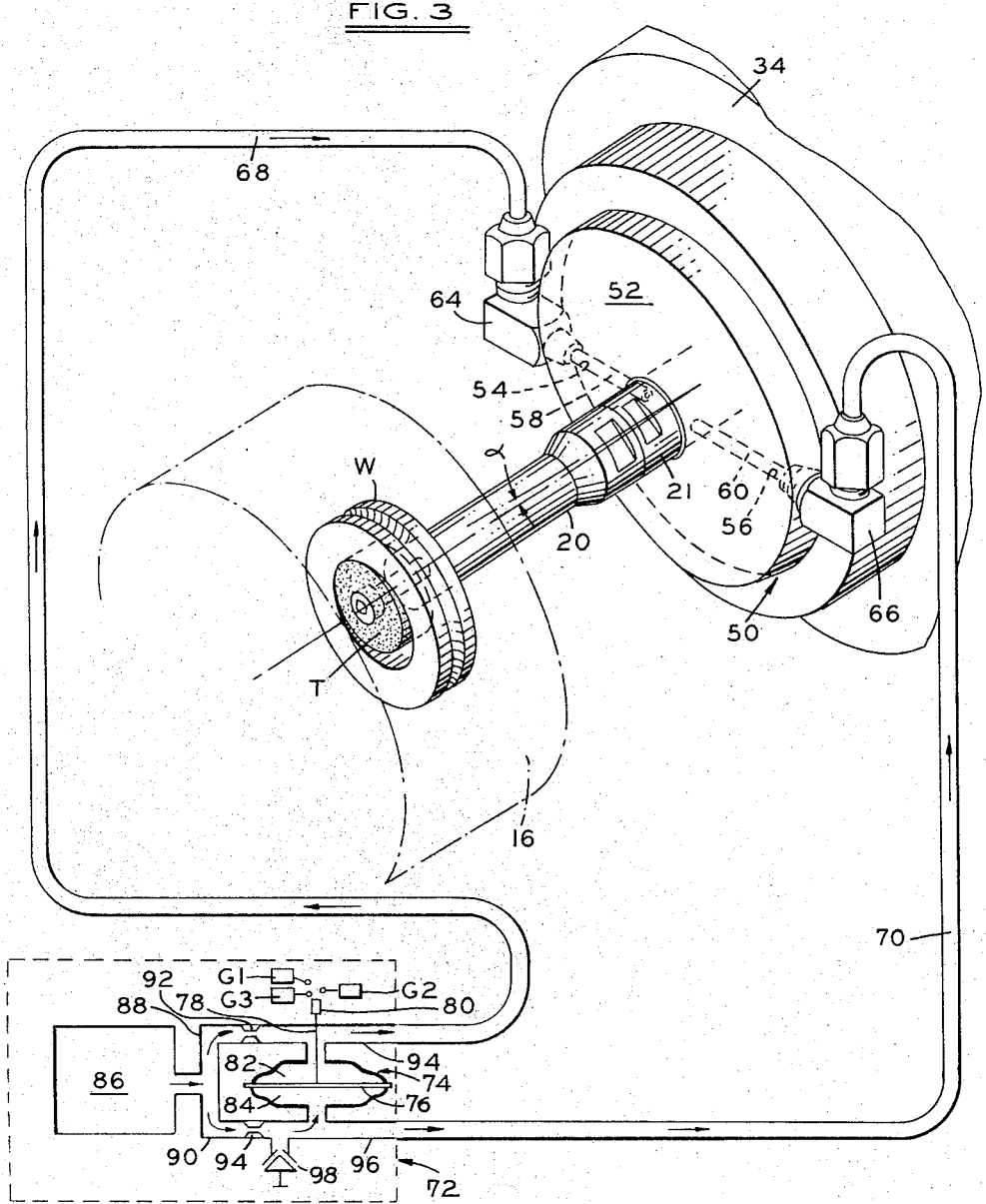

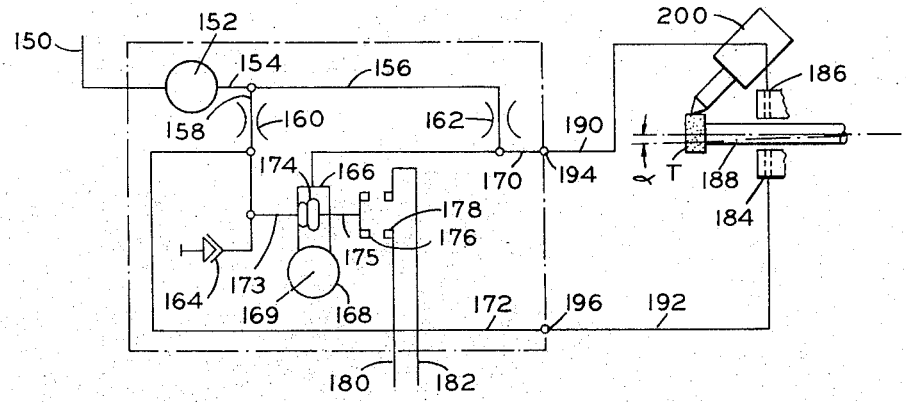
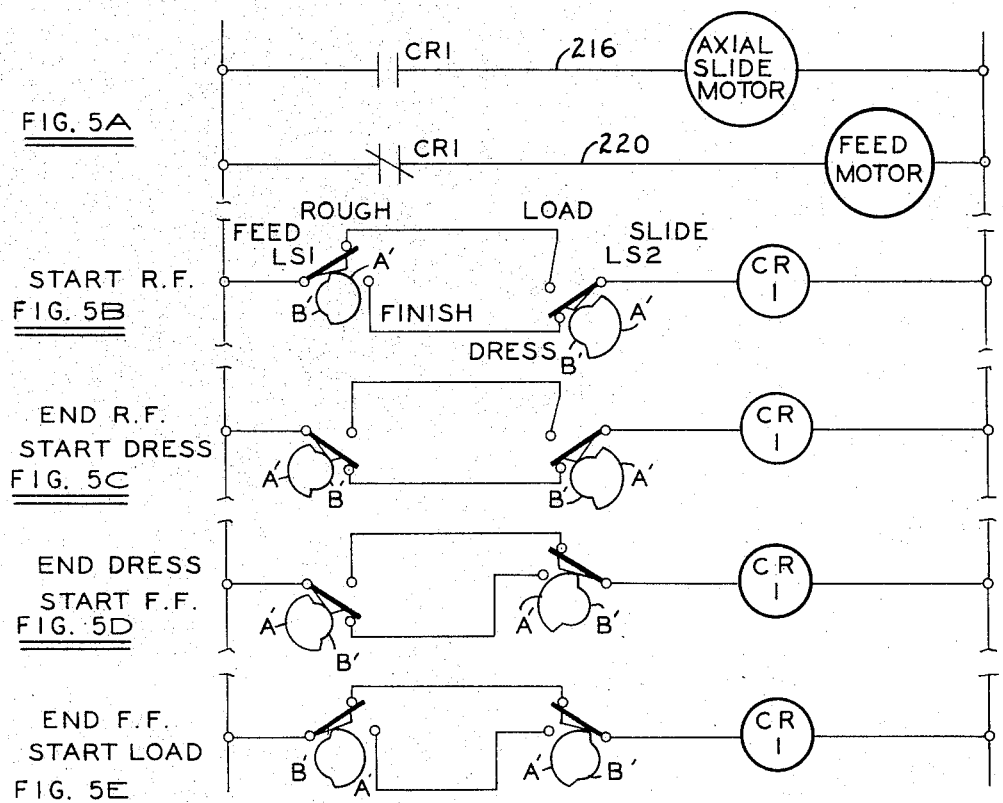

3,344,560
CONTROL DEVICE
Gordon E. Lillie, Upper Meadows, Bellows Falls, Vt.,
assignor to Bryant Chucking Grinder, Springfield, Vt.
Filed Aug. 4, 1965, Ser. No. 477,255
15 Claims. (Cl. 51—165)

ABSTRACT OF THE DISCLOSURE

Non-contacting air jet nozzles are mounted adjacent to and on opposite sides of the spindle of a grinding wheel, so as to impinge air on said spindle, whereby the differential air pressure caused by the deflection of said spindle from the contact pressure between the workpiece and grinding wheel during the grinding operation is utilized to continuously control the feed rate and automatically adjust the pressure between the workpiece and the grinding wheel.

---

This invention relates to a method and apparatus for automatically programming a machining process.

Several practical and useful systems of load sensing size control systems for grinding and honing machines are known to the art. One such system, for example, is described in U.S. Patent No. 2,585,533, issued February 12, 1952, wherein a sensing element periodically enters the hole to be ground from the side opposite that where the tool enters. Such a method has certain limitations, however, particularly in the case of "blind" holes or where the workpiece otherwise has such configuration that the gauge cannot enter or be used in the described way. In such cases, another method, commonly called "diamond sizing," is resorted to. This latter method is described in, for example, U.S. Patent No. 2,429,830, issued October 28, 1947, and is dependent on the relative position between the tool and the workpiece for control of the grinding cycle. That is, when a predetermined amount of feed movement has taken place, a suitable stop actuates, for example, a limit switch and thereby terminates the grinding cycle and conditions the machine for the next phase of said cycle.

A further practical and useful system includes a means responsive to grinding tool pressures against the workpiece, which pressures may be used to control the machine cycle as by terminating it. This system is described in, for example, U.S. Patent No. 2,834,160, issued May 13, 1958.

However, prior art machines have suffered from many disabilities, among which have been lack of sensitivity and accuracy, and especially lack of simplicity. The present invention overcomes these and other disadvantages encountered in the past with this type of machine. It is therefore an outstanding object of this invention to provide an internal grinding machine in which a sensitive non-contact type of sensing device controls the length of the roughing, finishing, and "sparking out" periods of the grinding cycle.

Another object of this invention is the provision of an internal grinding machine in which a load sensing means controls the automatic operation of the cycle.

Another object is to improve process control in a machining operation.

A further object of this invention is to sense tool wear by indicating dull tools which need sharpening or grinding wheels which need dressing.

A further object of this invention is to sense machine load by providing a signal which can be used to vary the feed rate of the grinding wheel against the workpiece, vary the depth of cut of the grinding wheel against the workpiece, or vary the speed of revolution of the workpiece in order to control the rate of stock removal for optimum performance.

A further object of this invention is to sense first tool contact and initiate a change in feed rate thus saving time by using a fast rate of approach and decreasing its rate upon immediate contact of the tool and workpiece.

A further object of this invention is to provide a safety device by sensing machine overload thus stopping the machine before any damage is done to the tool, workpiece, or machine tooling apparatus.

A further object of this invention is to provide a non-contact type of sensing device which is used where tool loading is equated to part size.

Another object of this invention is to provide a signal at a predetermined machine deflection level after the cross feed carriage has reached its reference rough or finish stop, to terminate either a portion, or all of the feed cycle.

Another object of this invention is to provide a non-contact type of load sensing device which would indicate any force transverse to the rotational axis of a grinding wheel, a tool, a cutter and/or a workpiece.

To the accomplishment of the foregoing and related ends, the invention then comprises the features hereinafter fully described, and particularly pointed out in the claims, the following description and the annexed drawings setting forth in detail certain illustrative embodiments of the invention, these being indicative, however, of a few of the various ways in which the principles of the invention may be employed.

FIG. 1 shows a plan view of a typical grinding machine;

FIG. 2 shows the elevational view of a typical grinding machine shown in FIG. 1;

FIG. 3 is an enlarged isometric view of the non-contact sensing device, and includes a simplified circuit diagram of the electrical and fluid control system;

FIG. 3B shows a cross-sectional view of the non-contact sensing device;

FIGS. 5A, 5B, 5C, 5D and 5E show schematically a series of operations which automatically control the movements of the tool and workhead slide;

FIG. 6 shows the non-contact type of sensing means used for sensing the forces of a diamond dresser.

Figure 4:
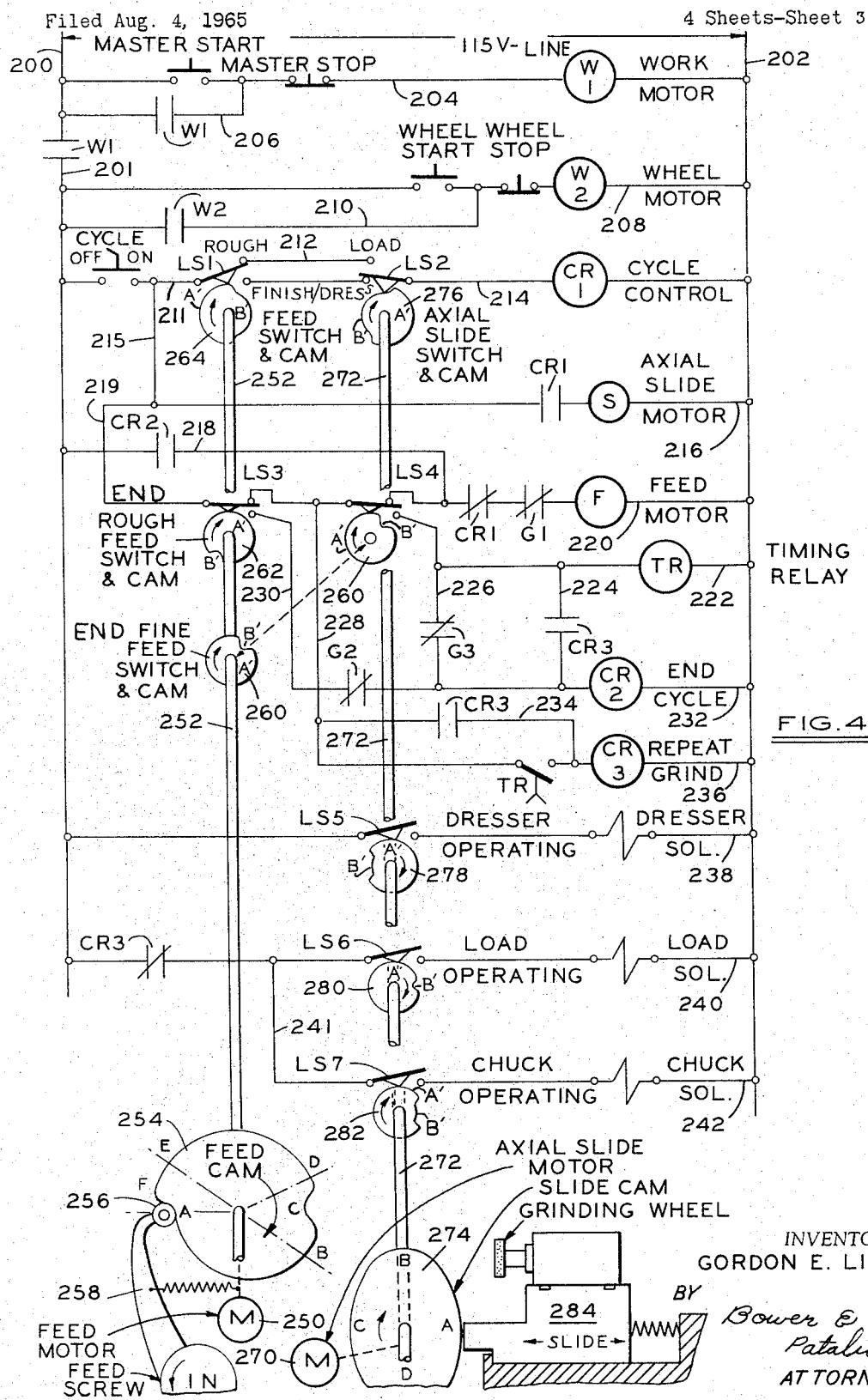
FIG. 4 is a simplified circuit diagram showing the automatic electrical control system embodying the principle of the invention.

An automatic grinder must accept a varying amount of stock, or material to be ground away, in the workpieces processed through the machine. Variations in workpiece condition, in addition to the amount of metal to be removed to bring the workpiece to finish size, may also include such quality variables as rough hole geometry (taper, out-of-round, etc.), metallurgical differences in material itself, hardness and so on.

It is often either impractical or undesirable to arrange such an automatic grinder for in-process gauging, and in these cases diamond sizing is used. Fixed stops in the cross feed carriage travel provide the reference points to terminate "rough" and "finish" feed in the "diamond size" cycle. Variations in quality such as stock and/or hardness, will impose a sizing inaccuracy in this described method of grinding due to varying machine deflection at the moment the cross feed carriage reaches the reference terminal points of rough and/or finish feed. Up to the present time the usual method of reducing this effect, and improving a machine's diamond sizing capability, is to introduce a fixed time delay, or dwell, at the feed stops to allow these varying deflection amounts to "grind out" altogether, or be reduced to a level within part size tolerance. This arrangement must provide for the extreme variations of workpiece condition and, therefore, some time is lost in all workpiece cycles with more favorable stock conditions.

The purpose of this invention is to provide a signal at a predetermined machining load level, after the cross feed carriage has reached its reference rough or finish stop, to terminate either a portion, or all of the feed cycle. This signal will come at a variable point in time and in this way adjust the feed cycle to the stock condition of each workpiece. By providing the end point of the feed cycle on the basis of a constant deflection with reference to the fixed rough and/or finish stop, sizing errors will be reduced to only those inherent in the machine structure, workpiece accuracy will be improved, and production rate will increase.

When a spindle mounted wheel is applied to a workpiece, the spindle acts like a cantilever beam and deflects away from the work. The longer the overhang outside of the front bearing, and the more slender the spindle projection, the greater the deflection. Furthermore, the front bearing compresses laterally increasing the deflection. Both deflections can produce taper and undersize bores in the workpiece being ground.

It would seem desirable to make the spindle large and short in order to minimize the deflection and hence the taper. But this is not always possible. Therefore, another method must be found to hold the taper and size within tolerance.

Traditionally, "sparkout" is used, which means stopping the feed while allowing the grind to continue under the force of the spindle deflection or flexure, or "spindle spring." If allowed to continue indefinitely, a point would finally be reached where the "spring" would reduce to a minimum and be balanced by the resistance of the material in the workpiece. Further contact would then only create friction and heat, burning the work and dulling the wheel.

In order to terminate the workwheel contact before this happens, it is usual to use a timer which is set for an average part. Some parts are not average, however, and either more or less time would be required to reach size. Parts requiring longer grind time because of too much stock or a metallurgical difference (hardness or toughness), would thus be left undersize. Such parts would require reloading and regrinding. Increasing the time on all parts would obviously not be the answer and would materially reduce the output of the machine, as well as dulling the wheel.

In the preferred embodiment of the invention a proximity non-contact type of gauge operated by air indicates to a pressure sensing unit the amount of deflection in the spindle caused by the grinding forces. When the mechanical cross feed on the grinder reaches its fixed stop, the grinding continues as the spring of the deflected spindle is relieved. When the deflection drops to a predetermined amount, the portion of the grind cycle under control (rough or finish) is terminated.

The device can also be used to limit peak pressures when the wheel is unable to remove stock as rapidly as the programmed feed rate requires. Each time the top limit is reached, the cross feed is interrupted, and resumed after a suitable pressure drop.

Referring to the drawings, FIG. 1 illustrates a typical internal grinding machine with a bed 10 having mounted on the left hand side thereof a workhead 12. On the workhead 12 is mounted a headstock 14 having a suitable holding means 16 for supporting and driving a workpiece W on which a surface of revolution is to be generated. Mounted on the workhead 12 is the work motor 13 which is adapted to rotate the workpiece in a manner and for a purpose to be herein disclosed.

On the other end of said base 10 a toolhead or tool spindle means 18 is mounted and contains a high speed rotatable wheelhead spindle 21 on which is mounted a tool spindle or quill 20 with its tool T which, together with its driving means are mounted coaxially inside a slide. The slide comprises part of said tool spindle structure which is adapted for reciprocatory movement along the axis of said tool spindle. The tool spindle means 18 is supported for pivotal movement about and for transverse movement along an axis coplanar with and at right angles to the axis of said tool spindle, such as disclosed in U.S. Patent No. 2,839,874, issued June 24, 1958. The reciprocating assembly means 22 as described in the above mentioned U.S. Patent No. 2,839,874, forms no part of this invention except for purpose herein disclosed.

Mounted on the tool spindle 18 is the axial slide motor 270 which, as shown in FIG. 2, rotates a worm gear 24 by means of conventional belt and pulley means 26. The worm gear 24 in turn rotates slide cam shaft 272 through a conventional wheel 25. The slide cam shaft 272 includes a series of cams 274, 276, 278, 280 and 282, see FIGS. 1 and 4, and mounted adjacent to the cams 276, 278, 280 and 282 for cooperation therewith are switches LS2, LS5, LS6 and LS7 respectively, for the purpose to be herein disclosed.

Shown in FIGS. 2 and 4, a feed motor 250 is mounted on the tool spindle means 18 and is adapted to rotate a worm gear 28 by means of a conventional belt and pulley means 30. The worm 28 is adapted to rotate a worm wheel 29 which rotates feed cam shaft 252. Mounted on the feed cam shaft 252 are cams 264, 262 and 260. Adjacent thereto are switches LS1, LS3 and LS4 which cooperate with cams 264, 262 and 260 respectively in a manner to be herein disclosed.

Mounted on the tool spindle means 18 is a feed screw arm 258 having a cam follower 256 adapted to engage feed cam 254. The feed screw arm 258 is biased, as for example, by means of a spring 257 against the cam 254. The feed screw arm 258 is mounted on an axial feed screw 32 which is connected to the housing 34 of the tool spindle means 18. Axial feed screw 32 is shown to be a left hand screw thread which provides infeed of the grinding tool T against the surface of the workpiece, however, it is well understood that a right hand screw thread can be adapted to provide the same function, as well as any other conventional means which can be adapted to provide infeed movement of the grinding tool against the surface of the workpiece.

According to the present invention, mounted on the front end of the wheelhead housing 34 is a sensing means 50 of the type to be herein disclosed. More specifically, as shown in FIG. 3, the sensing means in the preferred embodiment consists of a front bearing cap 52 mounted on the housing in a conventional manner and having a pair of bores 54 and 56 mounted diametrically opposite each other. Mounted within the bores 54 and 56 are a pair of airjet tubes or nozzles 58 and 60 respectively. As shown in FIG. 3B, the airjet tubes or nozzles extend slightly beyond the inner diameter of the front bearing cap 52 and into the bore 60 but not contacting the spindle 21. However, it is well understood that the number of sensing airjets is not limited to two, since sensing can be obtained satisfactorily with only one airjet or nozzle. Moreover, the sensing airjets or nozzles need not be diametrically opposite each other, but offset relative to each other to accommodate sensing of different size workpieces or different grinding procedures. Furthermore, it is well understood that the sensing means may include three sensing airjets or nozzles relative to each other by 120 degrees, or even include four sensing airjets or nozzles offset relative to each other by 90 degrees.

However, in the preferred embodiment shown, the sensing airjets or nozzles are diametrically opposite each other for the purpose herein defined. Conventional pneumatic coupling means 64, 66 are mounted to tubes 58 and 60 respectively, with air lines 68 and 70 connected to said coupling means 64 and 66 respectively. The air lines 68 and 70 are connected to a sensing mechanism which in this illustrated embodiment shows it to be a differential pressure sensing mechanism 72.

The differential pressure sensing mechanism 72 consists of a differential pressure switch 74 which has a diaphragm 76 adapted to be movable by virtue of the pressure differential on either side of said diaphragm. Connected to the diaphragm is a rod 78 with a switch contact member 80 adapted to contact switches G3, G2 and G1 respectively when the air pressure in chamber 82 is different than the air pressure in chamber 84 of the differential pressure switch 74. However, it is well konwn and accepted in the art that instead of the single differential pressure switch, a plurality of pressure switches may be connected to the pressure lines with each pressure switch adapted to be set at a different pressure such that at successive higher pressures each of the pressure switches will energize the contacts G3, G2 and G1 respectively.

The air is adapted to enter the system by any conventional means such as a pump 86. The air is pressurized and separated into two channels 88 and 90 and is further forced past restrictions 92 and 94 to thus equalize the pressures in both lines 94 and 96 coming out of the differential pressure mechanism 72. To further provide for equalized flow in lines 94 and 96, a zero adjust valve 98 is connected to one of the lines, as for example line 96.

As shown in FIG. 3 the tool spindle or quill 20 having a grinding tool T attached thereto is mounted in cantilever fashion to the wheelhead spindle 21. The grinding tool T is adapted to contact the surface of the workpiece W and as a result thereof is adapted to flex or bend the spindle through an angle alpha ($\alpha$). This spindle deflection is perceived or sensed by the air impinging on the shaft 21, as shown in FIG. 3B, which transmits the pressure differential to the differential pressure mechanism 72, shown in FIG. 3. The amount of deflection of the spindle is adapted to provide a pressure differential in the chambers 82, 84 of differential pressure switch 74, which in turn is adapted to move the diaphragm 76. Movement of the diaphragm 76 moves the switch contact member 80 into contact with switches G3, G2 and G1 respectively, for the purpose to be herein disclosed. That is, the air pressure in each of the tubes 58, 60 is bled out through the gap 62 between the tip or nozzle and the spindle, as shown in FIG. 3B. When the spindle deflects by an angle alpha ($\alpha$) the air in line 70 is restricted while the pressure in line 68 is given a greater gap through which to escape. This means higher pressure in lines 70 and 96 and less pressure in lines 68 and 94 which ultimately results in greater pressure in chamber 84 than in chamber 82 of the differential pressure switch 74. This differential pressure in the chambers causes the diaphragm 76 to move an amount proportional to the pressure change and causes the contact member 80 to contact the switches G3, G2 and G1 respectively.

THE CONTROL CIRCUIT

The foregoing mechanical and pneumatic arrangements are arranged, according to the invention, to be electrically controlled, and capable of automatic operation. That is to say, pressing the MASTER START button, shown on line 204 of FIG. 4, initiates the WORK MOTOR relay W1 through power obtained from lines 200 and 202, thus closing the circuit to the work motor 13. The circuit maintains its energized condition by virtue of contacts W1, on lines 206 and 200, now being closed; however, pressing the MASTER STOP button de-energizes the WORK MOTOR relay W1 and prevents further operation of the work motor and prevents power from entering line 201. Pressing the WHEEL START button on line 208 after the MASTER START button is depressed, energizes the WHEEL MOTOR relay W2 which also maintains its own holding circuit by virtue of contacts W2, on line 210, now being closed. Depressing the WHEEL STOP button, on line 208, de-energizes the WHEEL MOTOR relay W2 thus preventing power from energizing the wheel motor.

Turning the CYCLE SWITCH from OFF to ON, on line 214, applies power through switches LS3 and LS4 and normally closed contacts CR1 to energize FEED MOTOR relay F, on line 220, by way of lines 215 and 219. Assuming that a new workpiece is chucked and ready to be worked on, the cam follower 256 of FEED SCREW arm 258 is at point A of the FEED CAM 254 while the END ROUGH FEED SWITCH cam 262 is at its high point A', thus ascertaining that the power enters line 220. Thus power energizes FEED MOTOR relay F on line 220 by means of CYCLE SWITCH, lines 215, 219 and switches LS3 and LS4, contacts CR1 and contacts G1. Contacts G1 are located in the spindle deflection unit, which includes also the contacts G2 and G3 and, as disclosed hereinabove, are adapted to be operatively affected by a means for sensing spindle deflection. That is, as the grinding wheel moves against the workpiece the spindle deflects a certain amount. This deflection is picked off by the sensing means which depending upon the amount of deflection opens first the normally closed contacts G3. Further deflection opens the contacts G2 and continued deflections due to faster infeed of the grinding wheel against the workpiece than the rate of metal being removed opens contacts G1. As seen on line 220 opening of contacts G1 breaks the circuit to the FEED MOTOR relay F temporarily, thus allowing the FEED CAM 254 to stop rotating until the deflection of the spindle is reduced and thereby closing the contacts G1 again. Allowing contacts G1 to close again energizes the FEED MOTOR relay F causing the FEED CAM 254 to continue rotating.

Energization of FEED MOTOR relay F causes the feed motor 250 to rotate the shaft 252 which in turn causes rotation of FEED CAM 254. Rotation of FEED CAM 254 causes cam follower 256 attached to cam arm 258 to turn counterclockwise thus forcing the grinding wheel to move against the workpiece W. The movement of the grinding wheel toward the workpiece continues by virtue of the gradual increase of the arm movement caused by rolling contact of roller 256 from point A to point B on FEED CAM 254. Note that the SLIDE CAM 274 is not rotating and the wheelhead on slide 284 stays forward in grinding position. As the movement of the grinding wheel continues to move against the workpiece the deflection of the spindle causes the opening of the first of the contacts, namely G3, which affects nothing during the earlier portion of grinding. In fact, further spindle deflection may open contacts G2 without affecting the grinding operation. However, if contacts G1 are opened the FEED MOTOR 250 will stop preventing further infeed rotation of the grinding wheel until the spindle deflection is reduced. Once the spindle deflection is reduced to where the contacts G1 are closed, FEED MOTOR relay F is energized thus causing rotation of FEED MOTOR 250 to rotate shaft 252. Connected to shaft 252 is the END ROUGH FEED SWITCH cam 262 which is timed so that it drops from a maximum radius, such as A', to a minimum radius, such as B', allowing END ROUGH FEED CAM switch LS3 to break the power circuit, on line 220, thereby de-energizing the FEED MOTOR relay F. De-energizing the FEED MOTOR relay F stops rotation of the FEED MOTOR 250. The cam follower 256 is still on the concentric portion near B of the FEED CAM 254 and grinding continues as the deflection of the spindle is relieved. This is commonly known as "sparkout." As the spindle deflection is reduced contacts G2 close and power is now shunted from line 219 to line 230 through END ROUGH FEED CAM switch LS3 to line 230, to contacts G2, now closed, and energizes END CYCLE relay CR2 on line 232. Energizing the END CYCLE relay CR2 closes contacts CR2 on line 218 thus allowing power to enter from line 201 to line 218 past closed contacts CR2 and through contacts CR1 and G1 on line 220 to thus energize the FEED MOTOR relay F. Energizing the FEED MOTOR relay F starts the rotation of the FEED MOTOR 250 causing FEED CAM 254 to rotate which allows the cam follower 256 to drop into the notched position C on the cam 254, thus effecting a backing off of the FEED SCREW arm 258. The switch arm on END ROUGH FEED CAM switch LS3 is moved from radius B′ to radius A′ on the cam 262. Backing off of the FEED SCREW arm in effect causes backward movement of the grinding wheel away from the surface of the workpiece. Simultaneously the FEED SWITCH cam 264 is rotated to radius B′ on the cam thus allowing switch LS1 to drop from ROUGH to FINISH contacts, see FIG. 5C. This completes the circuit on line 214 by allowing power to proceed from line 201, past the CYCLE switch to line 211, past switches LS1 and LS2 to thus energize CYCLE CONTROL relay CR1. Energizing CYCLE CONTROL relay CR1 opens the contacts CR1 on line 220 de-energizing FEED MOTOR relay F.

Energizing CYCLE CONTROL relay CR1 closes normally open contacts CR1 on line 216 allowing power to energize AXIAL SLIDE MOTOR relay S. Energizing the AXIAL SLIDE MOTOR relay S effects rotation of axial slide motor 270 which rotates shaft 272. Rotation of the shaft 272 causes rotation of the SLIDE CAM 274 in a clockwise direction from position A to position B causing the WHEEL HEAD on slide 284 to slide back for the purpose to be hereinafter disclosed.

The wheel head is now in position for the grinding wheel to be dressed. This is effected when SLIDE CAM 274 is rotated from position A to position B simultaneously effecting a rotation of DRESSER OPERATING CAM 278 which causes DRESSER OPERATING switch LS5 to drop from radius A′ to radius B′ on the cam 278 thus closing the contacts. Closing the contacts allows power to enter line 238 to energize the DRESSER SOLENOID. Energizing the DRESSER SOLENOID causes a dressing tool (not shown) to dress the grinding wheel. The grinding wheel is dressed while the contacts of DRESSER OPERATING switch LS5 is maintained closed by virtue of the fact that the switch arm is on radius B′ of the DRESSER OPERATING cam 278. Continued rotation of the DRESSER OPERATING cam 278 raises the switch arm from radius B′ to radius A′ on DRESSER OPERATING CAM 278 thus de-energizing the DRESSER OPERATING SOLENOID. Simultaneously with rotation of the DRESSER OPERATING cam 278, the SLIDE CAM 274 has moved from position B to position C thus allowing the WHEEL HEAD to move forward again to the grinding position. Rotation of the SLIDE CAM 274 to position C thus prepares the dressed grinding wheel to complete the finish grinding operation. This is accomplished by simultaneous movement of the AXIAL SLIDE SWITCH cam 276 from radius B′ to radius A′ on the cam thus causing the switch arm of AXIAL SLIDE CAM switch LS2 to move from the DRESS contact position to the LOAD contact position, see FIG. 5D.

Movement of the AXIAL SLIDE CAM switch LS2 from the DRESS position to the LOAD position de-energizes CYCLE CONTROL relay CR1 thus allowing contacts CR1, on line 216, to open thereby de-energizing AXIAL SLIDE MOTOR relay S. De-energizing AXIAL SLIDE MOTOR relay S stops rotation of AXIAL SLIDE MOTOR 270.

De-energizing CYCLE CONTROL relay CR1, restores normally closed contacts CR1, on line 220, which allows power to energize the FEED MOTOR relay F on line 220, through lines 215, 219, END ROUGH FEED CAM switch LS3 and END FINE FEED CAM switch LS4 through closed contacts CR1 and G1. Energizing the FEED MOTOR relay F starts the rotation of FEED MOTOR 250 thus causing shaft 252 to rotate FEED CAM 254 once again. The cam follower 256 moves from position C on the cam to position D. At position D the FEED CAM changes to a fine feed rate and the contact with the work takes place somewhere between D and E. The gradual rise of the cam follower 256 on the rotatable FEED CAM 254 turns the FEED SCREW thus causing gradual incremental movement of the grinding wheel against the surface of the workpiece. At some point of its grinding operation deflection of the spindle will occur. If deflection is too great switch contacts G3, G2 and finally G1 will successively open temporarily interrupting energization of the FEED MOTOR relay F until, as described above, continued removal of the stock without infeeding will reduce the spindle deflection to the amount where the contacts G1 will close. When contacts G1 close the FEED MOTOR relay F is energized thus restarting the rotation of the FEED MOTOR 250 and consequent movement of the FEED CAM 254. Finally at position E on the FEED CAM 254, the periphery of the cam changes from a spiral portion to a concentric portion thus effectively continuing the grinding operation under control of the spindle deflection contacts G3, G2 and G1.

Concurrent with the rotation of the FEED CAM 254, the END FINE FEED SWITCH cam 260, also connected to shaft 252 is rotated to the point where the switch arm of END FINE FEED CAM switch LS4 drops from radius A′ on the cam to radius B′ thus causing FEED MOTOR relay F to be de-energized, stopping rotation of FEED MOTOR 250 and FEED CAM 254. Power is now shunted to line 226 which energizes TIMING RELAY TR on line 222. Energizing TIMING RELAY TR causes closing of contacts TR, on line 236, at a predetermined rate as preset in the machine. Now a race starts between the timing relay contacts TR and switch G3 to determine which will close first. Normally, the contacts TR are preset to take a greater amount of time than that necessary for the deflection in the spindle to be reduced to a normal minimum condition. The time required for the spindle deflection to be reduced to the normal minimum condition is known as "sparkout" or "runout" time. If the spindle deflection is reduced to normal so that contacts G3 close before the TIMING RELAY contacts TR close, on lines 226 and 236 respectively, the circuit is complete to energize the END CYCLE relay CR2 on line 232. Energizing the END CYCLE relay CR2 closes contacts CR2, on line 218, thus energizing FEED MOTOR relay F on line 220. Energizing the FEED MOTOR relay F restarts the FEED MOTOR 250, which in turn rotates shaft 252. Rotation of shaft 252 rotates FEED CAM 254 past position F on the cam dropping the follower 256 into position A and thus backing off the grinding wheel from the workpiece by reversing the feed screw. Simultaneously with rotation of the FEED CAM 254, rotation of FEED SWITCH CAM 264 effects movement of switch arm of FEED CAM switch LS1 from FINISH to ROUGH contact, as shown in FIG. 5E, thereby completing the circuit through contacts of AXIAL SLIDE CAM switch LS2 to energize CYCLE CONTROL relay CR1 on line 214 of FIG. 4. Energizing CYCLE CONTROL relay CR1 opens the CR1 contacts on line 220 and closes the CR1 contacts on line 216, thereby de-energizing FEED MOTOR relay F and energizing AXIAL SLIDE MOTOR relay S respectively. De-energizing the FEED MOTOR relay F stops rotation of FEED MOTOR 250. Simultaneously with the stopping of the FEED MOTOR rotation the AXIAL SLIDE MOTOR is started which in turn rotates SLIDE CAM 274 to position D on the cam forcing the slide to the rear thus moving the grinding wheel so as to clear the completed workpiece. In conjunction with rotation of the SLIDE CAM 274, the CHUCK OPERATING cam 282 rotates to the point where the switch arm of CHUCK OPERATING switch LS7 drops from position A′ to position B′ on the cam and simultaneously the LOAD OPERATING cam 280 is rotated to the point where the switch arm of LOAD OPERATING switch LS6 drops from radius A′ to radius B′ on the cam. Closing the contacts of switch LS7 allows power to energize CHUCK SOLENOID on line 242 by means of closed contacts CR3 on line 240, line 241, and switch LS7. Closing the contacts of switch LS6 allows power to energize the LOAD SOLENOID on line 240 by means of closed contacts CR3 and switch LS6. Energizing the CHUCK SOLENOID operates the chuck by releasing the ground workpiece and energizing the LOAD SOLENOID ejects the finished workpiece and loads a new workpiece. Continued rotation of the CHUCK OPERATING cam 282 raises the switch arm of CHUCK OPERATING switch LS7 breaking the circuit which causes the chuck to grip the new workpiece. The AXIAL SLIDE MOTOR 270 continues to rotate the SLIDE CAM 274 toward position A on the cam thereby allowing the slide 284 to return the wheel to grinding position in preparation to repeat the cycle.

At position A on SLIDE CAM 274, the AXIAL SLIDE SWITCH cam 276 causes movement of the switch arm of AXIAL SLIDE CAM switch LS2, on line 214, from LOAD to DRESS position, see FIG. 5B. This de-energizes CYCLE CONTROL relay CR1 which in turn de-energizes the AXIAL SLIDE MOTOR relay S by virtue of the fact that contacts CR1 on line 216 are now opened, see FIG. 5A. Simultaneously, contacts CR1 on line 220 are now closed and power energizes the FEED MOTOR relay F to repeat the grinding cycle as hereinbefore described. The machine will continue to grind and the cycles will repeat until stopped manually or by automatic devices well known in the art.

Referring to descriptive portion of the timing relay, the above mentioned description relates a normal condition where the contacts G3 close before the TIMING RELAY TR closes. However, assuming that the TIMING RELAY TR closes before the contacts G3 close, this can be an indication of the following items;

(a) A tougher part requiring extra grind time or wrong material,
(b) Dull wheel therefore not cutting well,
(c) Excessive stock to be removed,
(d) Change in coolant or other machine conditions.

When the TIMING RELAY contacts close before contacts G3 close, power is shunted from line 220 through line 228, through now closed contacts TR and energizes REPEAT GRIND relay CR3 on line 236. Energizing REPEAT GRIND relay CR3 causes contacts CR3 on line 240 to open thereby preventing CHUCK SOLENOID and LOAD SOLENOID to be energized. Hence the grinding cycle is repeated on the same workpiece. All other functions remain the same. The REPEAT GRIND relay CR3 remains energized through its holding contacts CR3 on line 234 until the end of rough feed when the circuit is de-energized by virtue of ROUGH FEED switch LS3 dropping into position B' on ROUGH FEED SWITCH cam 262.

In an embodiment that is adapted to provide a means for sensing contact between a diamond dresser and a grinding wheel, FIG. 6 shows an arrangement that provides a quick relative approach of the diamond dresser to a grinding wheel, which upon deflection causes a decrease in its traverse approach rate. This is accomplished in a manner similar to the preferred embodiment hereinabove disclosed, in that air is delivered by any suitable means to line 150 and then to a regulator 152. From the regulator 152 the air enters line 154 from where it is separated into two lines 156 and 158 where the air flows through two restriction valves 160 and 162. An adjustment valve 164 is connected to line 158 to provide equalization between the pressure lines. A pressure gauge 168 connected to a differential pressure switch 166 is a means for determining equalization of the pressure in the lines. The valve 164 is adjusted until the needle 169 on the gauge 168 shows that an equilibrium pressure exists between the line 170 and 172. The differential pressure switch 166 has a bellows 174 which when expanded causes contacts 176 and 178 to touch thereby completing a circuit of lines 180 and 182 to energize the proper circuitry necessary for the purpose to be herein disclosed. As in the preferred embodiment disclosed hereinbefore, airjets or nozzles 184 and 186 mounted adjacent to a spindle 188 force a flow of air or other medium to impinge on the spindle. Lines 190 and 192 are connected to lines 170 and 172 through port connections 194 and 196 respectively. As the diamond dresser 200 is contacted by the grinding tool T, a deflection of the tool spindle alpha ($\alpha$) results which causes an increase of pressure in lines 192, 172 and 173 causing expansion of the bellows. Contacts 176, connected to bellows 174 by rod 175, are adapted to move against the contacts 178 thereby completing the circuit to lines 180 and 182. Completing the circuitry changes the fast relative approach traverse speed of the diamond dresser 200 and the grinding wheel T to a slower dress traverse speed.

In an internal grinding machine the load sensing means, as disclosed hereinabove, is used: to limit the fastest rough grinding rate of stock removal in order to avoid excessive wheel breakdown; to sense a second preset load level corresponding with a terminate rough grind load level; and to sense a third preset load level to terminate a rough grind "sparkout" period in the grinding cycle corresponding to a rough size of the workpiece being ground and automatically taking into account such process variables as wheel size, condition of the workpiece, condition of the grinding wheel, workpiece material variation, stock allowance and coolant application. This automatic sensing is similarly applied for the finish grinding portion of the feed cycle.

In a grinding machine the grinding wheel must be dressed in order to achieve uniform dimensional accuracy in the bores of small parts. In this connection, it is within the purview of one skilled in the art to incorporate the invention as hereinabove disclosed to sense the load variations on a diamond dresser, whether rotary or stationary, in order to change the infeed rate from a rapid approach to a compensation infeed rate and further initiate automatic new wheel dressing, such as disclosed in my U.S. Patent No. 3,102,529, issued September 3, 1963.

Thus it is readily apparent that the invention herein disclosed is directed to a novel sensing means which controls the entire operation during a machining process and/or signals the operator to make needed changes in setup or adjustments to continue the process control. While in the foregoing description the invention was explained in connection with certain specific terms and language, it is understood that the present disclosure is illustrative rather than restrictive and that changes and modifications may be resorted to without departing from the spirit of the invention as defined by the claims which follow.

I claim:

1. In a machine having a workpiece on which a surface is to be formed, comprising, a rotatable spindle carrying a cutting tool, at least one orifice adjacent said spindle, from which issues a stream of controlled fluid impinging on said spindle, a gauging device sensitive to variations in the pressure of the fluid feeding said orifice and a circuit programming said machine which is responsive to said pressure variations occurring as a result of flexure in said spindle.

2. In a machine for metal removal from a workpiece by means of a cutting tool, said cutting tool mounted on a member, said member adapted to be deflected when said cutting tool is in contact with said workpiece, a fluid operated sensing means adjacent said deflected member, and a circuit means for utilizing the signal from said fluid operated sensing means to control the rate of stock removal.

3. In combination, a rotating workhead carrying a workpiece on which a surface of revolution is to be machined, a spindle, a metal removing tool mounted on said spindle, a sensitive fluid operated gauging means for signalling the distance from said spindle to said fluid operated gauging means, said signals being fed to a circuit for control of the machine cycle.

4. A grinding machine incorporating a workhead and chuck for rotating a workpiece comprising, a wheelhead, means for rotating said wheelhead, a grinding wheel spindle mounted in said wheelhead, at least one orifice adjacent said wheel spindle, a controlled source of air fed to said orifice, a sensitive relay for transmitting signals proportional to variation in the internal air pressure as a result of changes in the air escape gap between said orifice and said spindle, said signals transmitted to a circuit for automatically controlling the machine cycle.

5. In a grinding machine as in claim 4, wherein said automatic cycle includes a timing device to compare the length of one sizing period with a predetermined period for disabling the unload-load portion of the cycle in order to repeat the cycle on the same workpiece.

6. A grinding machine in combination, a work mount for holding a workpiece for machining, a cutter mounted on a cantilever, said cantilever adapted to be deflected, a sensitive fluid operated gauging device adapted to measure relative distances between said deflected and undeflected cantilever positions, and a programmed circuit containing switches sensitive to the degree of said deflection for signalling the completion of phases in the machine cycle.

7. In a grinding machine having a workhead, a wheelhead, a spindle having a grinding wheel mounted thereon and connected to said wheelhead, a sensing device noting the degree of spindle deflection due to a load against said grinding wheel, a wheel dresser, a circuit means controlling the traverse speed of said wheelhead past said wheel dresser and adapted to reduce said traverse speed from a quick approach speed to a dressing rate speed at the first contact between said grinding wheel and said wheel dresser.

8. In a grinding machine having in combination, a workhead, a wheelhead, a spindle, a grinding wheel, a crossfeed mechanism, the improvement comprising a sensitive fluid operated gauging means adapted for sensing deflection of said spindle due to contact with a workpiece while grinding, said fluid operated gauging means adapted to control the feed rate between said workpiece and said grinding wheel.

9. In a grinding machine, workpiece supporting means including a headstock means mounted therein for supporting a workpiece on which a surface of revolution is to be generated, carriage means movable relatively to said workpiece supporting means, grinding tool supporting means including a spindle for supporting a grinding tool in peripheral engagement with said surface of revolution to grind said surface and a fluid operated sensing means adapted to sense deflection of said spindle as said grinding tool is in engagement with said workpiece.

10. In the combination as set forth in claim 9 wherein said sensing means responsive to the degree of deformation of said spindle includes a pneumatic pressure means interposed between said spindle and said carriage means.

11. In a machine tool for metal removal from a workpiece, a tool carrying support, a cutting tool mounted on said support, a machining load fluid operated sensing means adapted to provide machinery load levels for reading directly at said tool carrying support, and a circuit means responsive to said signalled machining load levels for controlling the machining program by varying those parameters particular to the operation which determine finished workpiece quality attributes.

12. In a machine arranged for automatic diamond truing of a new grinding wheel mounted on a grinding wheel spindle, according to pre-established traverse and infeed rates, a load sensing means adapted to sense load variations directly at said grinding wheel spindle, a circuit means responsive to said variations for controlling said traverse and infeed rates in order to change these rates at the first instant of diamond to grinding wheel contact and initiate an automatic program of dressing said new grinding wheel.

13. In an internal grinder having a grinding spindle, a grinding load sensing means adapted to sense load variations directly at said grinding spindle, a circuit means responsive to the signalled grinding loads variations and their load levels as predetermined and preset, by controlling the automatic feeding program and by varying the feed cycle rates and time sequences to maintain the most consistent quality as the process variables of wheel size, surface feet per minute, workpiece geometry and metallurgical consistency, and coolant application in long run, automatic production.

14. In an internal grinding machine, a work support, a wheel support having a spindle with a grinding tool attached, said spindle being relatively movable to feed said grinding tool against a workpiece in said work support, feed means adapted to feed said tool against said workpiece, gauge means to measure the deflection of said spindle resulting from the force between the tool and said workpiece, and rate control means for said feed means responsive to said gauge means whereby said deflection is maintained substantially constant during at least a part of the grinding operation.

15. In the combination as set forth in claim 14, wherein said rate control means is being constantly responsive to a deflection of said spindle resulting from the force between the tool and said workpiece during grinding.

References Cited

UNITED STATES PATENTS

| | | | |
|---|---|---|---|
| 1,701,423 | 2/1929 | Sauveur | 77—32.7 |
| 2,429,830 | 10/1947 | Ljunggren | 51—50 |
| 2,585,533 | 2/1952 | Bryant et al. | 51—50 X |
| 2,801,502 | 8/1957 | Blood et al. | 51—165 |
| 2,834,160 | 5/1958 | Lillie | 51—50 X |
| 2,839,874 | 6/1958 | Maker | 51—50 |
| 2,978,689 | 4/1961 | Tech et al. | 77—32.7 |
| 3,102,529 | 9/1963 | Lillie | 125—11 |
| 3,200,671 | 8/1965 | Porath | 77—1 X |
| 3,211,025 | 10/1965 | Mottu | 77—3 |

LESTER M. SWINGLE, *Primary Examiner.*